US011235768B2

(12) United States Patent
Herman et al.

(10) Patent No.: US 11,235,768 B2
(45) Date of Patent: Feb. 1, 2022

(54) DETECTION OF VEHICLE OPERATING CONDITIONS

(71) Applicant: Ford Global Technologies, LLC, Dearborn, MI (US)

(72) Inventors: David Michael Herman, Oak Park, MI (US); Ashwin Arunmozhi, Canton, MI (US); Aaron Lesky, Ypsilanti, MI (US); Ronald Beras, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 16/521,836

(22) Filed: Jul. 25, 2019

(65) Prior Publication Data

US 2021/0024069 A1    Jan. 28, 2021

(51) Int. Cl.
| | |
|---|---|
| *B60W 30/18* | (2012.01) |
| *G08G 1/01* | (2006.01) |
| *B60W 50/00* | (2006.01) |
| *G06N 3/08* | (2006.01) |
| *G08G 1/052* | (2006.01) |

(52) U.S. Cl.
CPC ........ *B60W 30/18* (2013.01); *B60W 50/0097* (2013.01); *G06N 3/08* (2013.01); *G08G 1/0125* (2013.01); *G08G 1/0137* (2013.01); *G08G 1/052* (2013.01); *B60W 2520/10* (2013.01); *B60W 2554/00* (2020.02)

(58) Field of Classification Search
CPC ............ B60W 30/18; B60W 50/0097; B60W 2554/00; B60W 2520/10; G06N 3/08; G08G 1/0125; G08G 1/0137; G08G 1/052
See application file for complete search history.

(56) References Cited

U.S. PATENT DOCUMENTS

| | | | |
|---|---|---|---|
| 8,363,211 B2 | 1/2013 | Groitzsch et al. | |
| 9,877,114 B2 | 1/2018 | Sebastian et al. | |
| 10,200,676 B2 | 2/2019 | Hsu et al. | |
| 10,475,338 B1* | 11/2019 | Noel | G08G 1/052 |
| 2018/0308250 A1 | 10/2018 | Li et al. | |
| 2019/0377351 A1* | 12/2019 | Phillips | G05D 1/0214 |
| 2020/0180528 A1* | 6/2020 | Kim | B60W 50/0098 |
| 2020/0211377 A1* | 7/2020 | Chen | G08G 1/0112 |
| 2021/0016789 A1* | 1/2021 | Limbacher | B60W 60/0057 |
| 2021/0146962 A1* | 5/2021 | Kaji | B60W 40/08 |

OTHER PUBLICATIONS

Jim Curry, "Frequency-Modulated Automotive Lidar", Autonomous Vehicle Sensors Conference, San Jose, CA, Jun. 26, 2018 (18 pages).

(Continued)

*Primary Examiner* — Tyler J Lee
*Assistant Examiner* — Yufeng Zhang
(74) *Attorney, Agent, or Firm* — Frank A. MacKenzie; Bejin Bieneman PLC (57) ABSTRACT

A system includes a computer including a processor programmed to identify, based on data from first sensors included in a first vehicle, that a second vehicle proximate to a route of the first vehicle is stationary. The processor is further programmed to receive, from second sensors included in the first vehicle, transient velocity data from the second vehicle; and determine an operating condition of the second vehicle based on the transient velocity data.

20 Claims, 7 Drawing Sheets

(56) References Cited

OTHER PUBLICATIONS

Felix Heide, et. al., "Doppler Time-of-Flight Imaging", ACM Transactions on Graphics, Jul. 2015, retrieved from Internet URL: https://www.researchgate.net/publication/283889656_Doppler_Time_of_Flight_Imaging, (1 page).
Refael Whyte, et. al., "Application of Lidar Techniques to Time-of-Flight Range Imaging", Applied Optics, Oct. 14, 2015, retrieved from Internet URL: http://dx.doi.org/10.1364/ao.XX.XXXXXX (10 pages).
Mohammad Piracha, et. al., "Simultaneous Ranging and Velocimetry of Fast Moving Targets Using Oppositely Chirped Pulses From A Mode-Locked Laser", Optical Society of America, Optics Express vol. 19, No. 12, Jun. 6, 2011 (7 pages).
Liping Yu, et. al., Single-Camera High-Speed Stereo-Digital Image Correlation for Full-Field Vibration Measurement, Mechanical Systems and Signal Processing 94, pp. 374-383, Sep. 2017, retrieved from Internet URL: https://www.researchgate.net/publication/316009541_Single-camera_high-speed_stereo-digital_image_correlation_for_full-field_vibration_measurement (8 pages).

\* cited by examiner

DETECTION OF VEHICLE OPERATING CONDITIONS

BACKGROUND

Stationary vehicles can be located in areas typically used for vehicle parking vehicles such as a parking spot in a parking area or on a side portion of a road. Idle vehicles may begin to move and/or enter a flow of traffic and/or users may exit the vehicles. Such event can be unpredictable.

DETAILED DESCRIPTION

INTRODUCTION

Disclosed is a system comprising a computer including a processor and a memory. The memory includes instructions such that the processor is programmed to identify, based on data from first sensors included in a first vehicle, that a second vehicle proximate to a route of the first vehicle is stationary; receive, from second sensors included in the first vehicle, transient velocity data from the second vehicle; and determine an operating condition of the second vehicle based on the transient velocity data.

The processor can be further programmed to predict a trajectory of the second vehicle based on the determined operating condition.

The processor can be further programmed to adjust a travel path of the first vehicle based on the predicted trajectory of the second vehicle.

The processor can be further programmed to predict, based on the determined operating condition, at least one from a set including (1) that a user of the second vehicle will exit the second vehicle and (2) that a door of the second vehicle will open; and adjust the travel path of the first vehicle based on the prediction.

The processor can be further programmed to receive from the second sensors, transient velocity data from a surface supporting the second vehicle; and determine the operating condition in part based on the transient velocity data from the surface supporting the second vehicle.

The processor can be further programmed to receive from the second sensors, transient velocity data from a third vehicle proximate to the first vehicle; and determine the operating condition in part based on the transient velocity data from the third vehicle proximate to the first vehicle.

The processor can be further programmed to receive weather data; and determine the operating condition in part based on the weather data.

The processor can be further programmed to select a measurement target on the second vehicle; and direct the second sensors to collect the transient velocity data from the measurement target.

The processor can be further programmed to input the transient velocity data to a trained neural network which determines the operating condition; and receive the operating condition from the trained neural network.

The convolutional neural network can be trained using a plurality of transient velocity data including transient velocity data representative of a stationary vehicle in each of a plurality of controlled operating conditions, the controlled operating conditions corresponding respectively to ground truths for purposes of training the neural network.

Further disclosed is a method comprising identifying, by a computer, based on data from first sensors included in a first vehicle, that a second vehicle proximate to a route of the first vehicle is stationary; receiving, from second sensors included in the first vehicle, transient velocity data from the second vehicle; and determining an operating condition of the second vehicle based on the transient velocity data.

The method can further include predicting a trajectory of the second vehicle based on the determined operating condition.

The method can further include adjusting the travel path of the first vehicle based on the predicted trajectory of the second vehicle.

The method can further include predicting, based on the determined operating condition, at least one from a set including (1) that a user of the second vehicle will exit the second vehicle and (2) that a door of the second vehicle will be opened; and adjusting a travel path of the first vehicle based on the prediction.

The method can further include receiving from the second sensors, transient velocity data from a surface supporting the second vehicle; and determining the operating condition in part based on the transient velocity data from the surface supporting the second vehicle.

The method can further include receiving from the second sensors, transient velocity data from a third vehicle proximate to the first vehicle; and determining the operating condition in part based on the transient velocity data from the third vehicle proximate to the first vehicle.

The method can further include receiving weather data; and determining the operating condition in part based on the weather data.

The method can further include selecting a measurement target on the second vehicle; and directing the second sensors to collect the transient velocity data from the measurement target.

The method can further include inputting the transient velocity data to a trained neural network which determines the operating condition; and receiving the operating condition from the trained neural network.

In the method, the convolutional neural network can be trained using a plurality of transient velocity data including transient velocity data representative of a stationary vehicle in each of a plurality of controlled operating conditions, the controlled operating conditions corresponding respectively to ground truths for purposes of training the neural network.

Further disclosed herein is a computing device programmed to execute any of the above method steps.

Yet further disclosed herein is a computer program product, including a computer readable medium storing instructions executable by a computer processor, to execute any of the above method steps.

Exemplary System Elements

A computer in a first vehicle may apply object recognition to identify a second vehicle as a stationary vehicle in the first vehicle's environment. A vehicle environment is an area of volume determined by a specified radius (that can vary based on environmental conditions such as ambient light, precipitation, etc.), including terrain, objects and conditions, in which the vehicle is operating. A stationary vehicle, as used herein, is a vehicle that is not moving, i.e., wheels of the vehicle are substantially non-moving with respect to a ground surface. In some cases, the stationary vehicle may be parked, for example in a parking location. A parking location, as used herein, is a designated parking spot or other area where vehicles are typically parked, such as a side portion of a street or road. In another case, the stationary vehicle may be double parked, i.e., stationary for some amount of time but located within a lane of traffic. In other cases, the stationary vehicle may be stopped at a stop sign, stopped at a traffic light, stuck in traffic, etc., while executing a trip to a destination.

A variety of operating conditions may be determined for a stationary vehicle. An operating condition, as used herein, means a measurable set of physical parameters for a vehicle and/or the vehicle environment. A non-limiting list of operating conditions that can be determined for a stationary vehicle includes a user entering the vehicle (ingress), a user exiting the vehicle (egress), a door opening, a door closing, the vehicle running (engine or motor running), the vehicle turning on (key-on or other vehicle start event), the vehicle turning off, a user activating the parking brake, a change in the engine rotation speed, music playing in the vehicle, vehicle occupied, vehicle unoccupied, vehicle inactive (no apparent user activity of active vehicle components), etc.

Even though stationary, the vehicle may display oscillating or pulse like movements, i.e., movements that stop and start and/or change direction at substantially regular intervals, of a portion of a vehicle, such as the vehicle body or an exhaust pipe. These oscillating or pulse like movements can be used to determine one or more operating conditions of the stationary vehicle. For example, the vehicle body, supported on a vehicle suspension, may move along one or any combination of (1) a first axis perpendicular to a surface supporting the vehicle (i.e., up and down), (2) a second axis through the vehicle from front to back and (3) a third axis perpendicular to the axis through the vehicle from front to back (i.e., from side to side).

The oscillating or pulse like movements may be characterized according to a transient velocity of these movements. The transient velocity is a time-varying speed of the oscillating or pulse like movements and may be measured in units of meters per second. The computer in the first vehicle, via sensors, may receive transient velocity data of the oscillating or pulse like movements of a second vehicle that is stationary, and, based on the transient velocity data, predict an operating condition for the stationary vehicle. Based on the identified likely operating condition, the computer may then predict, or update a prediction, of a trajectory of the second stationary vehicle.

The transient velocity of the stationary vehicle may be substantially unique for each operating condition. That is, the transient velocity resulting from a vehicle ingress may be different from the transient velocity resulting from an egress. The transient velocity resulting from the vehicle running may be different from the transient velocity resulting from music being played in the vehicle.

A vehicle computer on the first vehicle, via the first vehicle sensors, can collect transient velocity data for a stationary vehicle along a route of the first vehicle. The route of the first vehicle, as used herein, means streets, lanes, roads, etc., along which the first vehicle plans to travel for a trip, i.e., from an origin to a destination. Based on the transient velocity data, the vehicle computer may identify an operating condition of the stationary vehicle and update a prediction of a future trajectory of the stationary vehicle. Based on the updated predicted trajectory, the first vehicle computer may adjust a travel path along the route of the first vehicle to reduce the likelihood of the second stationary vehicle approaching or entering the travel path of the first vehicle, or otherwise interfering with the travel of the first vehicle. A travel path, as used herein, is a line and/or curve (defined by points specified by geo-coordinates) steered by the first vehicle along the route.

Figure 1:
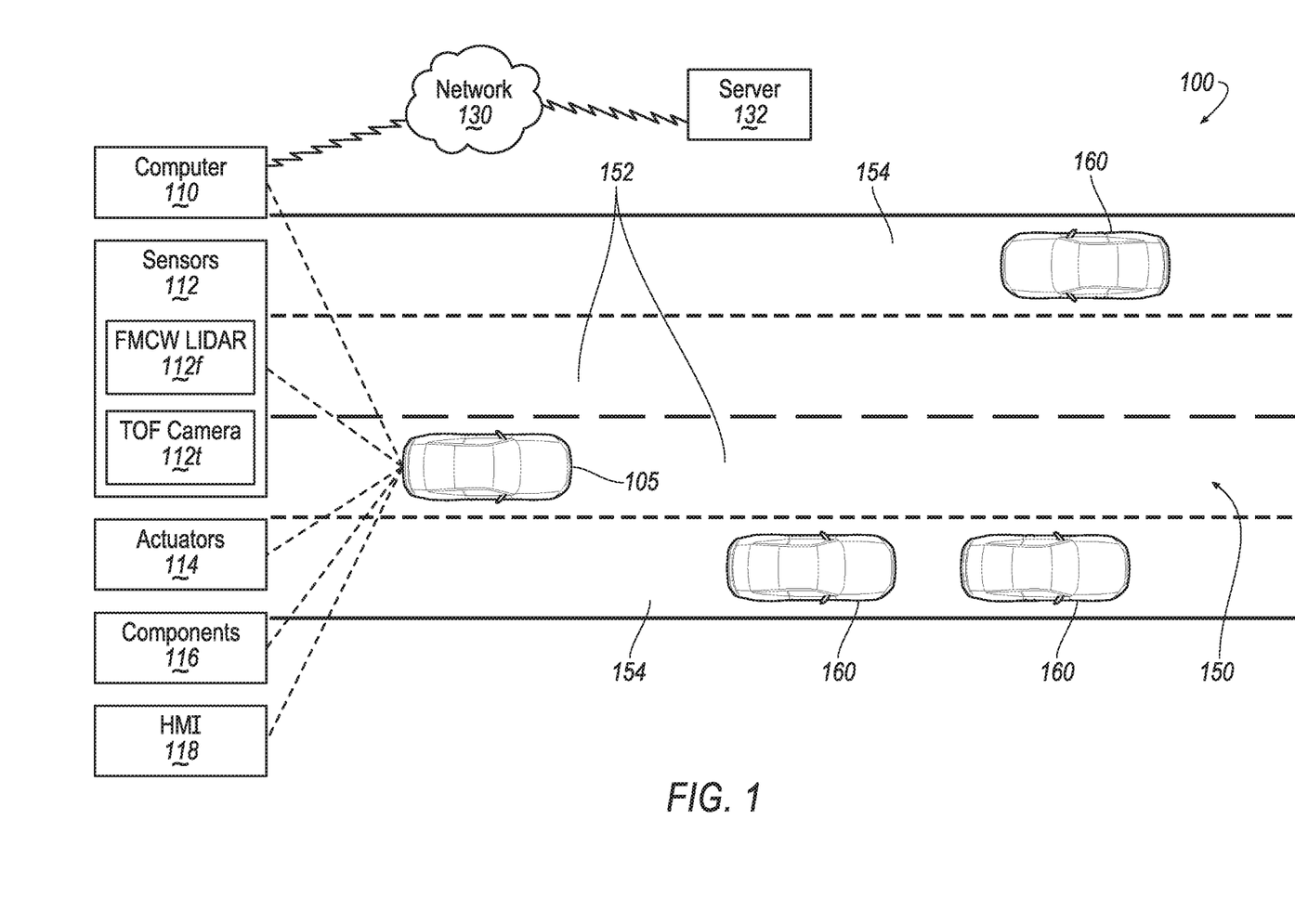
FIG. 1 is a diagram of an example system for monitoring and responding to operating conditions of stationary vehicles.

Turning to FIG. 1, an example system 100 includes a vehicle 105, a network 130 and a server 132.

The vehicle 105 is a land vehicle such as a car, truck, motorcycle, etc., and includes a vehicle computer 110, sensors 112, actuators 114, vehicle components 116, and a human-machine interface (HMI) 118. The vehicle 105 operates on a road 150. The road 150 includes lanes 152 along which the vehicle 105 may travel, and further includes side portions (e.g., berms) 154 where second vehicles 160 may be located.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle communications network, more than one processor, e.g., included in electronic control units (ECUs) or the like included in the vehicle 105 for monitoring and/or controlling various vehicle components 116, e.g., a powertrain controller, a brake controller, a steering controller, etc. As used herein, the vehicle communications network is defined as one or more mechanisms for wired or wireless communications between systems and sub-systems of the vehicle 105. The vehicle communications network can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct.

Via the vehicle communications network, the vehicle computer 110 may transmit messages to various systems and subsystems in the vehicle 105 and/or receive messages from the various devices, e.g., sensors 112, actuators 114, vehicle components 116, a human-machine interface (HMI) 118, etc. Additionally, in cases where the vehicle computer 110 actually comprises a plurality of devices, the vehicle communications network may be used for communications between devices represented as the vehicle computer 110 in this disclosure. Further, as described below, various controllers and/or sensors 112 may provide data to the vehicle computer 110 via the vehicle communication network.

Vehicle sensors 112 may include a variety of devices such as are known to provide data to the vehicle computer 110. For example, the sensors 112 may include Light Detection And Ranging (LIDAR) sensor(s) 112, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 112 fixed to vehicle 105 bumpers may provide data to provide locations of the objects, second vehicles 140, etc., relative to the location of the vehicle 105. The sensors 112 may further alternatively or additionally, for example, include camera sensor(s) 112, e.g. front view, side view, etc., providing images from an area surrounding the vehicle 105.

The sensors 112 may further include temperature sensors, pressure sensors, rotation sensors, angle sensors, position sensors, torque sensors, etc. to detect vehicle operating states such as vehicle cabin temperature, vehicle engine temperature, vehicle speed, vehicle acceleration, vehicle turning angle, engine speed, brake pressure, etc.

Still further, the sensors 112 may include frequency modulated continuous wave (FMCW) LIDAR 112$f$, and time-of-flight (TOF) cameras 112$t$. FMCW LIDAR 112$f$ can detect transient velocities of objects such as second vehicles 160. Based on the transient velocity, the FMCW LIDAR 112$f$ can generate transient velocity data and provide the transient velocity data to the computer 110. Time-of-flight cameras 112$t$ measure phase differences between components of transmitted light and reflected light from a target to determine a distance and/or a velocity of the target. In some cases the Lidar 112$f$ may be solid state allowing the ability to steer the lidar at specific locations to collect distance and transient velocity data over time. In other cases the lidar transmitters and receivers may be mounted onto a mechanical assembly which may rotate or transmit and receive light along an optical path incorporating a moving, translating or rotating mirror surface to scan the fixed lidar point throughout the road environment. In such cases the lidar points may not acquire transient velocity data at the same physical point in the space in each sweep. In such cases, the point cloud data of transient velocity measurements may be interpolated, e.g. linear, nearest neighbors, etc., or extrapolated via a vehicle dynamics model obtained from fitting a model to dynamics simulation data of one or both of the first and second vehicles 105, 160.

Based on the modelling of one or both of the first and second vehicles 105, 160 and numerical methods such as described above, the computer 110 may cancel out vibrations of the first (ego) vehicle 105 and predict/estimate transient velocity behavior of the second vehicle 160. For example, a neural network for estimating transient velocity may be based on vehicle models including fixed points in space on the vehicle bodies. Sensors 112 (e.g., FMCW LIDAR 112$f$) measurement points on the second vehicle 160 may not exactly correspond to the fixed points in space on the vehicle body. Numerical methods to interpolate/extrapolate measurement locations on the second vehicle 160 to those fixed points to get the required input to the neural network. The computer 110 may apply the numerical methods to the data collected from the sensors 112, and then submit the interpolated/extrapolated data to the neural network to receive an estimated transient velocity behavior of the second vehicle 160.

The computer 110 may collect transient velocity data of second vehicles 160 in the environment of the vehicle 105 via the FMCW LIDAR 112$f$ or time-of-flight cameras 112$t$. As described below, the computer 110 may determine an operating condition of the second vehicle 160 based on the transient velocity data.

The vehicle 105 actuators 114 are implemented via circuits, chips, or other electronic and or mechanical components that can actuate various vehicle subsystems in accordance with appropriate control signals as is known. The actuators 114 may be used to control vehicle components 116, including braking, acceleration, and steering of a vehicle 105.

In the context of the present disclosure, a vehicle component 116 is one or more hardware assemblies, which may include an electronic control unit (ECU) including one or more processors and memory including instructions for programming the processors, adapted to perform a mechanical or electro-mechanical function or operation—such as moving the vehicle 105, slowing or stopping the vehicle 105, steering the vehicle 105, etc. Non-limiting examples of vehicle components 116 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, a suspension, an electronic stability control (ESC) module, a wiper control module, lighting, an entertainment system, etc.

The vehicle 105 further includes a human-machine interface (HMI) 118. The human-machine interface (HMI) 118 includes input devices such as knobs, buttons, switches, pedals, levers, touch screens, microphones, etc. that can receive input from a user. For example, the HMI 118 may include a brake pedal, an accelerator pedal, and a steering wheel for receiving inputs from a user for controlling the vehicle 105. The input devices may include sensors 112 to detect user inputs and provide user input data to the computer 110. For example, the steering wheel may include sensors 112 to detect an angle of rotation of the steering wheel and provide the data to the computer 110.

The HMI 118 further includes output devices such as displays (including touch screen displays), speakers, lights, etc. that output signals or data to the user.

The HMI 118 is coupled to the vehicle communications network and can send and/or receive messages to/from the computer 110 and other vehicle sub-systems. As non-limiting examples, the HMI 118 may, based on user inputs, send messages over the vehicle communications network to control vehicle control systems, climate control systems, entertainment systems, lighting systems, communications systems, etc.

In addition, the vehicle computer 110 may be configured for communicating via a vehicle communications module with devices outside of the vehicle 105, e.g., through a vehicle-to-vehicle (V2V) or vehicle-to-infrastructure (V2X) wireless communications to another vehicle 105 (typically via direct radio frequency communications) and/or (typically via the network 130) a server 132. The vehicle communications module can include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the vehicle communications module include cellular, Bluetooth, IEEE 802.11, IEEE 802.11p, IEEE 1609, dedicated short-range communications (DSRC), cellular V2V, 5G/LPE and/or wide area networks (WAN), including the Internet, providing data communication services.

The network 130 represents one or more mechanisms by which a vehicle computer 110 may communicate with the server 132. Accordingly, the network 130 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), 5G/LTE, etc.), local area networks (LAN) and/or wide area networks (WAN), including the Internet, providing data communication services.

The server 132 can be a conventional computing device, i.e., including one or more processors and one or more memories, programmed to provide operations such as disclosed herein. Further, the server 132 can be accessed via the network 130, e.g., the Internet or some other wide area network. The server 132 can provide data, such as map data, traffic data, weather data, etc. to the vehicle computer 110.

The road 150 can be any surface where the vehicle 105 can travel, and along which or on which second vehicles 160 may be located. For example, the road 150 may be a suburban road or city street with marked or unmarked lanes 152 and side portions 154. The road 150 may further be a limited access highway with lanes 152 for travel and side portions 154. Still further, the road 150 may be a parking lot or parking structure with lanes 152 (in this case, lanes between rows of parked cars) along which the vehicle 105 can travel and side portions 154 (the rows of parked cars) where second vehicles 160 may be stationary.

Second vehicles 160 may be land vehicles such as cars, trucks, motorcycles, construction vehicles, etc., and may include similar systems and subsystems as the vehicle 105 described above, but are assigned a separate reference numeral for purposes of distinguishing from a host or ego vehicle 105.

A second vehicle 160 may be stationary. As noted above, in some cases, for example when the second vehicle 160 is parked, the second vehicle 160 may be stationary and located in the side portion 154 of the road 150 along which the vehicle 105 is travelling. In other cases, second vehicles 160 may be stationary and in a travel lane 152 of the road 150, such as when the second vehicle 160 is stopped at a traffic signal or stop sign, double parked, or disabled, etc.

A second vehicle 160 can be classified according to its one or more operating conditions. For second vehicles 160 that are stationary, a non-limiting list of operating conditions includes (1) a user entering the vehicle (ingress), (2) a user exiting the vehicle (egress), (3) a door opening, (4) a door closing, (5) the vehicle running (engine or motor running), (6) the vehicle turning on (key-on or other vehicle start event), (7) the vehicle turning off, (8) a user activating the parking brake, 9) music playing in the vehicle, 10) vehicle occupied, 11) vehicle unoccupied, 12) vehicle inactive. The second vehicles 160 may display transient velocities that vary based on the operating condition(s). In addition to variations based on an operating condition, transient velocities may vary depending on measurement targets on the second vehicle 160 where the transient velocities are measured. Measurement targets as used herein, are areas on the second vehicle 160 toward which sensors 112 for measuring transient velocity are directed to collect transient velocity data. Non-limiting examples of measurement targets include an area on the second vehicle body such as near a front license plate, near a rear license plate, at a center point of the second vehicle hood, etc.; and externally visible vehicle components 116 such a side-view mirror, a bumper, a center point on a vehicle door, a tail pipe, a muffler, a front grille, a hatch, a windshield, a rear window, a tail fin, a splitter, a canard, an air dam, a tire deflector, a diffuser, etc. For example, the transient velocity of a tail pipe of the second vehicle 160 may be different from the transient velocity of the body of the second vehicle 160 when the second vehicle 160 is running.

Measurement targets may be selected for characterizing different operating conditions of the second vehicle 160 based on transient velocities. For example, a measurement target may be selected based on proximity to a vibration source within the second vehicle 160. For example, a front grille of a second vehicle 160 may be selected as a measurement target due to its proximity to the vehicle engine. Additionally, or alternatively, measurement targets may be selected based on empirical studies. For example, measurements may indicate that the transient velocity of an exhaust pipe correlates strongly with a running engine, or that the transient velocity of a vehicle door correlates strongly with music being played.

The transient velocities of different measurement targets of second vehicles 160 under different operating conditions can be measured and recorded, for example by a FMCW LIDAR 112f. A library of transient velocity signatures can be obtained under controlled (e.g., laboratory) conditions, in which characteristic transient velocities of different second vehicle measurement targets are stored as samples, for example in the server 132. The transient velocity signatures may be used to train a computer such as the computer 110 in a machine learning mode. The machine learning model may receive further input such as the vector direction of the lidar measurement due to the fact the FMCW techniques measure the radial transient velocities rather than normal to the surface. For example, a vehicle may be approaching vehicle. The transient velocity data, positions in space of the measurements on the vehicle, and the radial velocity vector components may be used as inputs into the machine learning model. The transient velocity data may be passed directly or after some pre-processing step such as a fast Fourier transformation (FFT).

The stored samples may be organized, for example, as a table that identifies transient velocity signatures (i.e., a record of transient velocities of a measurement target over time) associated with a target location and operating condition for a type of vehicle. A "type of vehicle" as used herein means a classification of category of vehicle having common features. For example, a sports utility vehicle (SUV) may be a type of vehicle. As another example, a specified model of SUV may be a type of vehicle. Table 1, below, is an example of a portion of a table identifying transient data signatures with measurement targets and operating conditions for a vehicle type. Example transient velocity signatures may be transient velocity measurement curves as shown in FIGS. 5-8 below.

TABLE 1

Vehicle Type: SUV

| Measurement Target | Operating Condition | Transient Velocity Signatures |
|---|---|---|
| Hatch | Driver Ingress | Curve 502 (see FIG. 5) |
| Hatch | Driver Door Closed | Curve 602 (see FIG. 6) |
| Tail pipe | Vehicle Running | Curve 702 (see FIG. 7) |
| Tail pipe | Music On | Curve 802 (see FIG. 8) |

Conditions in addition to an operating condition may affect the transient velocity data collected from the second vehicle 160. For example, movements of the sensors 112 on the first (host or ego) vehicle 105 used to collect the transient velocity data may be superimposed on, filtered, or subtracted from the transient velocity data collected from the second vehicle to adjust the second vehicle transient velocity data to account for movements of first vehicle sensors 112. Further, weather conditions, for example wind, may cause additional movement of the second vehicle 160 that may mask operating conditions. As described below, to compensate for movement of the sensors 112, the computer 110 may make adjustments based on reference data, e.g., the computer 110 can collect transient velocity data from a non-moving object. Alternatively or additionally to compensate for the influences of weather conditions, the computer 110 may collect transient velocity data from other second vehicles 160 in the environment of the first vehicle 105.

The computer 110 can receive and analyze data from sensors 112 substantially continuously, periodically, and/or when instructed by a server 132, etc. Further, conventional classification or identification techniques can be used, e.g., in a computer 110 based on LIDAR sensor 112, FMCW LIDAR 112f, camera sensor 112, time-of-flight (TOF) cameras 112t, etc., data to identify a type of object, e.g., vehicle, person, rock, pothole, bicycle, motorcycle, etc., as well as physical features of objects and operating conditions of objects.

The computer 110 can further be programmed to determine an operating condition or likely operating condition of a second vehicle 160 that is stationary based on input transient velocity data. The computer 110 can collect transient velocity data from the stationary second vehicle 160. In an example, the computer 110 may then pass the transient velocity data through a fast Fourier transform (FFT) to convert the velocity history to the frequency domain and input the frequency domain transient velocity data to a trained convolutional neural network (CNN). The convolutional neural network (CNN) can be trained to perform the operating condition processing by processing a plurality of transient velocity signatures at different locations on a vehicle for a known operating condition. For example, the computer 110 may pass data from each measurement target through a separate channel of the FFT and input the frequency domain data from each of the measurement targets to the CNN. The known operating condition is ground truth for the plurality of transient velocity signatures. The ground truth may further be specific to a type of vehicle. The computer 110 can collect transient velocity data from the stationary second vehicle 160 and input it to the convolutional neural network. The data may include the measurement target of the measurement and may further include the type of the second vehicle 160. The neural network, based on the transient velocity data from the stationary second vehicle 160, may determine a likely operating condition for the second vehicle 160.

Figure 2:
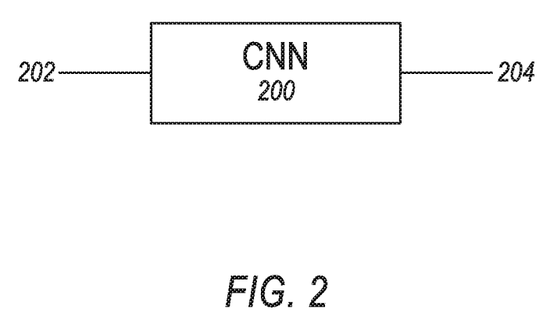
FIG. 2 is a diagram of an example convolutional neural network.

FIG. 2 is a diagram of an example convolutional neural network (CNN) 200. The CNN 200 is a software program that can be implemented on a computing device such as the computer 110 that can be trained to input transient velocity data of a second vehicle 160 at an input 202 and output an operating condition in response at an output 204. The CNN 200 includes a plurality of convolutional layers that extract hidden features from the transient velocity data the second vehicle 160 which are passed to a plurality of fully-connected layers that transform the hidden features into the operating condition at the output 204. The CNN 200 can be trained to perform operating condition processing by processing a plurality of transient velocity data of stationary vehicles to determine the operating condition for each transient velocity profile for a respective vehicle. The determined operating condition is defined as "ground truth", because it was determined independently from the CNN 200. The CNN 200 is trained by inputting the transient velocity data at the input 202 and backpropagating results to be compared with the ground truth to determine a loss function. Training the CNN 200 includes determining parameters for convolutional and fully-connected layers that minimize the loss function. When trained, a CNN 200 can input transient velocity data at the input 202 for a second vehicle 160 and output a likely operating condition at the output 204.

As another example, the computer 110 may input the transient velocity data to a recurrent neural network (RNN). A recurrent neural network (RNN) is a class of neural networks that is graph based and can exhibit temporal dynamic behavior. The RNN may be trained in a manner similarly to the training of the CNN described above. The trained RNN may determine, based on the transient velocity data, an operating condition for the second vehicle 160.

Figure 3A:
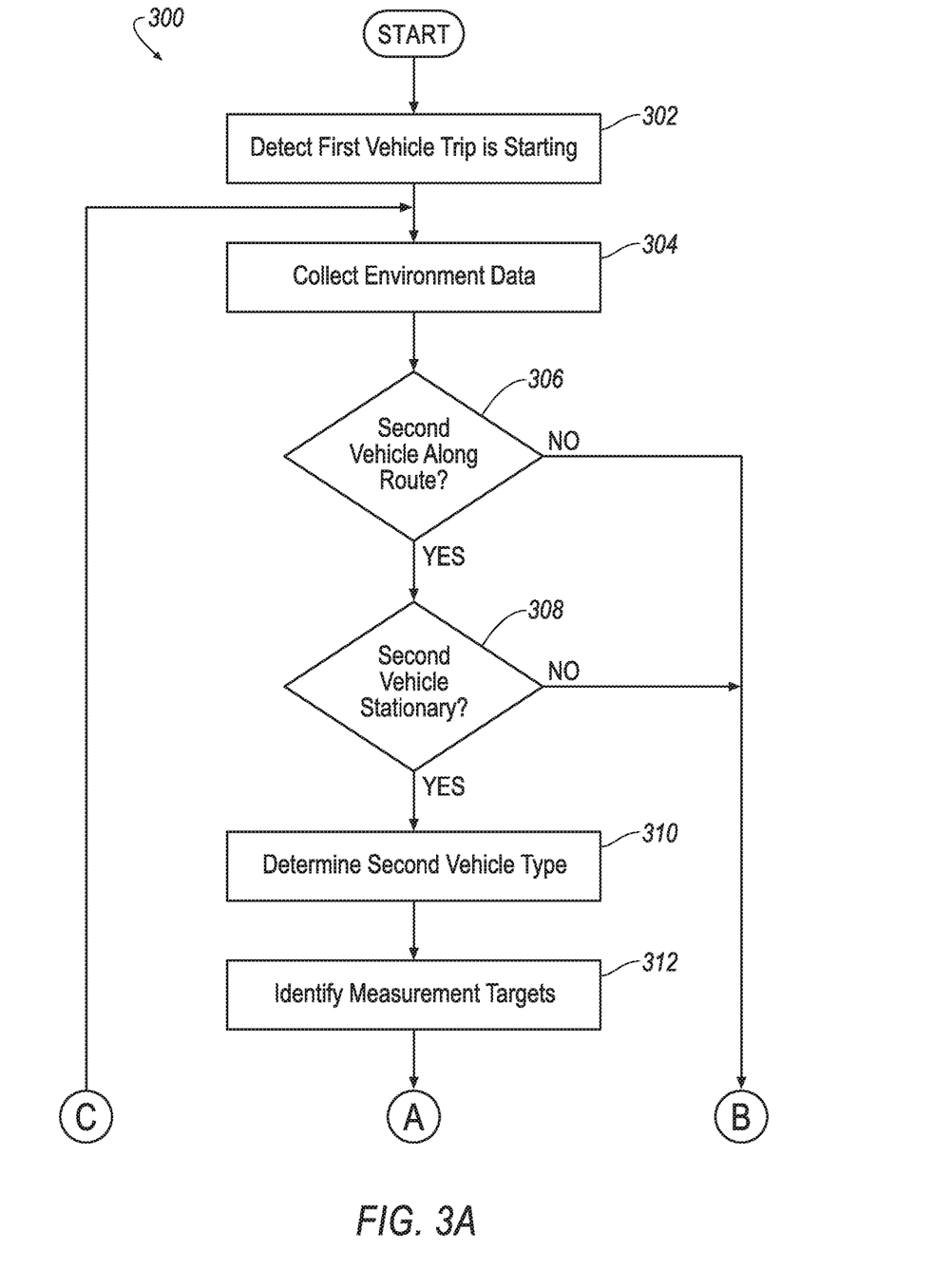
FIGS. 3A and 3B are a diagram for an example process for monitoring and responding to operating conditions of stationary vehicles.
Figure 3B:
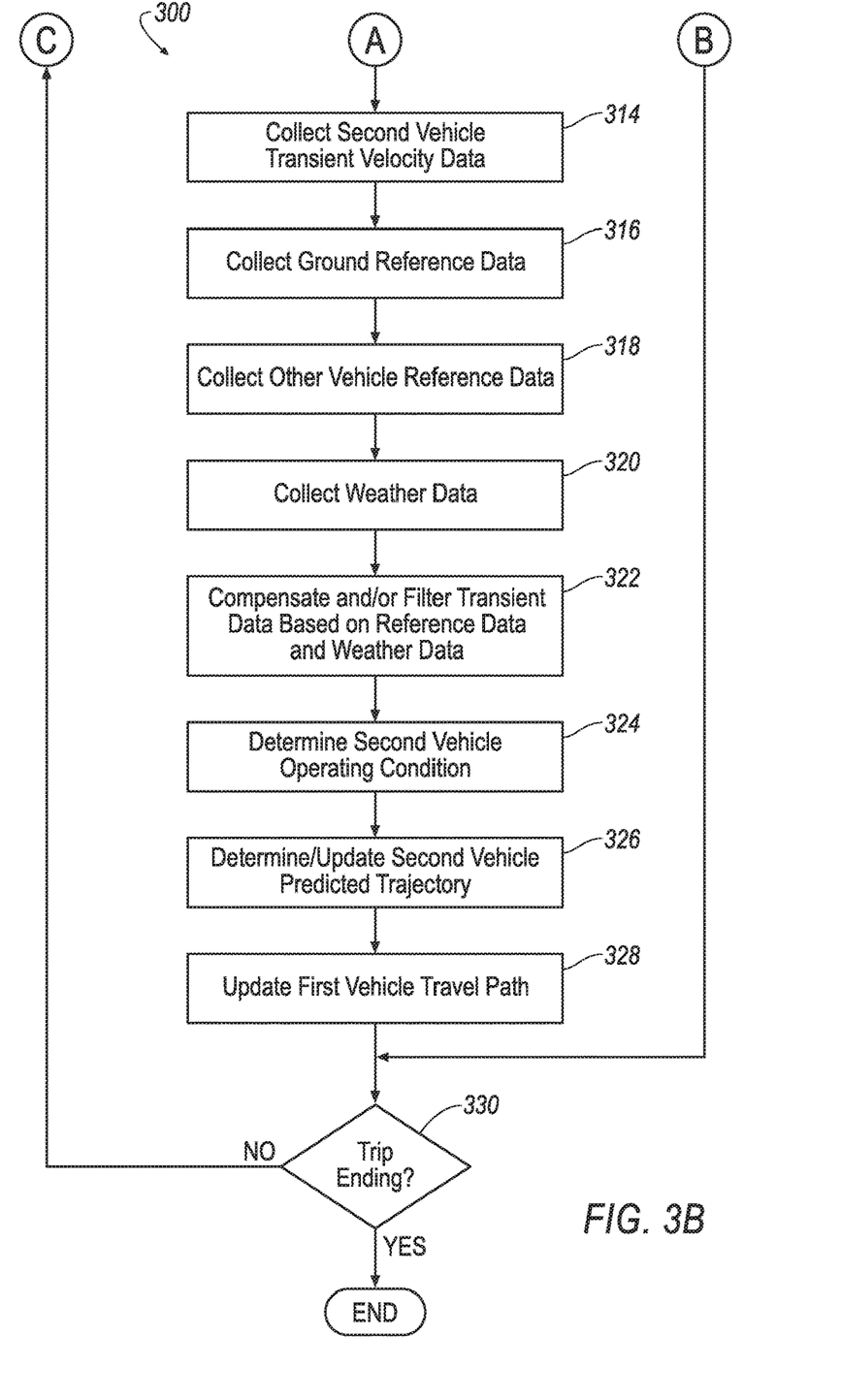

FIGS. 3A and 3B are a diagram of an example process 300 for classifying a second vehicle 160 according to a likely operating condition based on transient velocities. Sensors 112 on a vehicle 105 travelling along a route collect transient velocity data from a second vehicle 160 proximate to the route. Proximate to the route may be defined in this context as on the route or within a fixed distance of the route. Based on the collected transient velocity data, the computer 110 on the vehicle 105 assigns an operating condition to the second vehicle 160. Based on the assigned operating condition, the computer 110 may further predict, or update a prediction of the future trajectory of the second vehicle 160. Based on the predicted future trajectory of the second vehicle 160, the computer 110 may further revise the route or a travel path along the route of the vehicle 105 to reduce the likelihood that the trajectory of the second vehicle 160 will interfere with the trajectory of the vehicle 105.

The process 300 begins in a block 302.

In the block 302, the computer 110 in the vehicle 105 detects an event or data that indicates that a first vehicle 105 trip is starting. For example, the computer 110 may detect data on the communications network in the vehicle 105 indicating that the vehicle 105 has started or is about to be started. As non-limiting examples, the data or event may be an input from a user starting the vehicle such as a key-on event or activation of a start button. The data or event may further be a command received from another computer to start the vehicle. Still further, the data or event may be data indicating that the computer 110 is beginning to execute a trip pre-programmed into the computer. Still further, the data may be time-of-day data indicating a start time for a scheduled trip. Upon detecting that the first vehicle 105 trip is starting, the process 300 continues in a block 304.

In the block 304, the computer 110 collects data from an environment of the first vehicle 105. The environment data includes data of objects proximate to the first vehicle and further includes data of objects proximate to a route of the first vehicle 105. Proximate to the first vehicle 105 means in this context within range to be detected by the sensors 112 included in or on the first vehicle 105. As noted above, proximate to the route of the first vehicle 105 may be defined in this context as on the route or within a fixed distance of the route. The route is typically determined by the computer 110 based on a current location, a target destination, and other inputs from a user or other computer, such as preferred roads, schedule, etc.

In addition to collecting data regarding objects in the environment of the first vehicle 105, the computer 110 may collect other environment data such as weather data, time and calendar data, illumination levels, etc. Some of the data may be collected from the server 132 or another computer. Other data may be collected from sensors 112 in or on the vehicle 105. The process 300 continues in a block 306.

In the block 306, the computer 110 determines whether there is a second vehicle 160 that is proximate to the first vehicle 105 and/or proximate to the route of the vehicle 105 and may further determine a location and orientation of the second vehicle 160. An orientation of a vehicle as used herein is a direction the vehicle is facing, i.e., compass direction of a longitudinal axis of the vehicle. The computer 110 may use object recognition algorithms as are known to determine that an object in the environment is a second vehicle 160. In a case that a second vehicle 160 is in the environment of the first vehicle 105, the process 300 continues in a block 308. Otherwise, the process 300 continues in a block 330.

In the block 308, the computer 110 determines whether the second vehicle 160 is stationary. For example, the computer 110 may collect data at one or more times, and determine that the second vehicle 160 did not move between the two times. As another example, the computer 110 may determine that the second vehicle 160 is stationary based on radial velocity data. For example, the computer 110 may collect data from radar sensors 112. Based on the radial relative velocity difference between the first vehicle 105 and second vehicle 160, and within some noise threshold, the computer 110 may determine that the second vehicle 160 is stationary. As yet another example, the computer 110 may determine that the second vehicle 160 is stationary based on FMCW LIDAR 112f average data.

The computer 110 may further consider other data to determine whether the second vehicle 160 is stationary due to a traffic sign such as a stop sign or traffic signal. For example, in a case of a second vehicle 160 near an intersection with a traffic signal, the computer 110 may collect data from the second vehicle 160 when a traffic signal is green (in a direction that the second vehicle is facing) to determine that the second vehicle 160 is not stationary due to a red traffic signal. Stationary second vehicles 160, which, although stationary, appear to be participating in the flow of traffic based on factors such as location (e.g., located in a travel lane), and/or appear to be stationary due to a state of traffic signals (e.g., waiting at a red light), state of traffic (e.g., stuck in a traffic jam), etc., may be classified as "active," and therefore, more likely to participate in the flow of traffic.

In the case that the computer 110 determines that the second vehicle 160 is stationary, the process 300 continues in a block 310. Otherwise, the process 300 continues in the block 330.

In the block 310, the computer 110 determines a type of the second vehicle 160. The computer 110 may apply image recognition algorithms as are known to determine, for example, a make and model of second vehicle 160 and/or whether the vehicle is, for example, a sports utility vehicle (SUV), a pick-up truck, a sedan, a van, etc. Still further, the computer 110 may apply image recognition algorithms to determine which direction the second vehicle 160 is facing, and which sides of the second vehicle 160 can be detected by the sensors 112. For example, the computer 110 may determine that the second vehicle 160 is facing away from the first vehicle 105 such that sensors 112 can detect a back end of the second vehicle 160. The computer 110 may further determine that the second vehicle 160 is on a side portion 154 of the road 150 such that sensors 112 can detect a driver's side (left side from the perspective of an occupant seated in the second vehicle 160 and facing toward the front) of the second vehicle 160. The process 300 continues in a block 312.

In the block 312, the computer 110 identifies measurement targets for measuring transient velocity data of the second vehicle 160. Transient velocity data representative of a stationary vehicle 160 under varying operating conditions may be collected and stored for the measurement targets. For example, for a type of second vehicle 160, transient velocity signatures may be available for locations on a left, center and right of a rear bumper, for the exhaust pipe, for an area near or on the license plate, for a location in a center of the rear window (the hatch), for a location on a side-view mirror, etc. The computer 110 may select measurement targets from available targets based on the orientation of the second vehicle 160 relative to the sensors 112 of the first vehicle 105. The process 300 continues in a block 314.

In the block 314, the computer 110 collects transient velocity data from the selected measurement targets on the second vehicle 160. The computer 110 can be programmed to direct sensors 112 such as a FMCW LIDAR 112f or a time-of-flight (TOF) camera 112t to collect data from the measurement targets. The sensors 112 may collect transient velocity data from the measurement targets at one or more times. The computer 110 may collect (receive) the transient velocity data from the sensors 112 and store the transient velocity data in memory. The process 300 continues in a block 316.

In the block 316, the computer 110 collects ground reference data. Sensors 112 on the first vehicle 105 may, due to movement of the first vehicle 105, weather conditions, road conditions, etc., display oscillating or pulse like movements that include a transient velocity component. For example, a body of the first vehicle 105 may vibrate during travel. The vibrations of the body of the first vehicle 105 may impart an oscillation to the sensors 112 with a transient velocity component. The transient velocity of the sensors 112 may be superimposed on transient velocity measurements performed by the sensors 112 on the second vehicle 160. To estimate the effects of sensor 112 movement on transient velocity data from the second vehicle 160, the computer 110 may collect ground reference data. Ground reference data is transient velocity data for a surface on which the second vehicle 160 is resting, and/or a non-moving object connected to the surface on which the second vehicle 160 is resting. For example, the computer 110 may measure the transient velocity data for a portion of the road 150 at a location near a rear wheel of the second vehicle 160. As another example, the computer 110 may measure the transient velocity data of a curb on a side of the road 150 near the second vehicle 160. Near the second vehicle 160 in this context means within a fixed distance, for example, within one meter, of the second vehicle 160.

As described below, the ground reference data may be used to compensate for transient velocity of the sensors 112 collecting the data. The process 300 continues in a block 318.

In the block 318, the computer 110 collects other second vehicle 160 reference data, from other second vehicles 160 available in the environment of the first vehicle 105. Other second vehicle 160 reference data is transient velocity data from other second vehicles 160. The transient velocity data from other second vehicles 160 may be used to identify operating conditions that apply commonly to the vehicle 105 and second vehicles 160 such as weather conditions. Similarly to the measurements performed on the second vehicle 160, the computer 110 may identify one or more measurement targets on the respective other second vehicles 160 and direct the sensors 112 to collect transient velocity data from the measurement targets.

The transient velocity data from other second vehicles 160 may be used to compensate for environmental factors that are causing transient velocity in multiple second vehicles 160 in the environment and may also be causing transient velocity in the first vehicle 105. For example, wind may cause transient velocity in first and second vehicles 105, 160 in the environment. As another example, a heavy truck travelling through the area may cause transient velocity in first and second vehicles 105, 160 in the environment. The process 300 continues in a block 320.

In the block 320, the computer 110 collects weather data that may impact transient velocity data. This data may already be available from the environment data collected as described in reference to the block 304. The weather data may include wind and precipitation data that may impact transient velocity data or the collection of the transient velocity data. The process 300 continues in a block 322.

In the block 322, the computer 110 compensates or filters the transient velocity data from the measurement targets on the second vehicle 160 based on the ground reference data, the other vehicle reference data and/or the weather data.

Regarding the ground reference data, the computer 110 may identify transient velocities of the sensors 112 due to mounting on the first vehicle 105 that may be superimposed on the transient velocity data for the second vehicle 160. In one example, the computer 110 may subtract the ground reference transient velocity data from the second vehicle transient velocity data. Furthermore, multiple ground points may be collected to compute the specific transient velocity relative to the radial velocity direction of the collected data per each point in space. In another example, the computer 110 may identify a range of frequencies in the ground reference data. The computer 110 may then filter the second vehicle reference data to remove or reduce signals in the range of frequencies identified in the ground reference data. The examples are not intended to be limiting. Other approaches may be used to compensate the second vehicle transient velocity data based on the ground reference data.

Regarding the other second vehicle reference data, the computer 110 may identify transient velocities of other second vehicles 160 that are included in the second vehicle 160. As an example, the computer 110 may subtract the other second vehicle 160 transient velocity data from the second vehicle 160 transient velocity data. As another example, the computer 110 may identify a range of frequencies in the other second vehicle 160 transient velocity data and filter the second vehicle 160 transient velocity data to remove or reduce signals in the range of frequencies. The examples are not intended to be limiting. Other approaches may be used to compensate the second vehicle transient velocity data based on the other second vehicle transient velocity data.

Regarding the weather data, the computer 110 may, for example, estimate an impact of weather on the second vehicle 160 transient velocity data, and adjust the data for the estimated impact. For example, the computer 110, or the server 132, may maintain a data base indicating an expected transient velocity of a type of vehicle due to wind striking the vehicle from a direction relative to the vehicle (i.e., wind striking perpendicular to a side, at an angle to a side, perpendicular to a front, at an angle to the front, etc.). As a simplified example, the table, for a type of vehicle, may include, wind direction, wind speed, and a transient velocity and a frequency of the transient velocity signal. As an example, Table 2 may be a portion of a database for a vehicle type.

TABLE 2

| Wind Direction (angle relative to axis through vehicle from back to front) | Wind Speed (kilometers/hour) | Transient velocity (meters/second) | Frequency of Transient Velocity Signal (Hertz) |
|---|---|---|---|
| 0 (toward back) | 10 | $0.13e^{-3}$ | 5 |
| 30 | 30 | $0.35e^{-3}$ | 5 |
| 90 (directly toward side of vehicle) | 10 | $0.81e^{-3}$ | 5 |
| 135 | 30 | $0.82e^{-3}$ | 5 |

Based on the database, the computer 110 may, for a type of vehicle (as determined in the block 310), estimate an impact of weather conditions on the second vehicle 160, and adjust the transient velocity data by either subtracting the estimated impact from the data, or filter the data to remove or reduce signal components in the frequency range indicated by the database.

Other approaches may be used to adjust the transient velocity data of the second vehicle 160 based on ground reference data, other second vehicle 160 reference data and weather data. For example, a recurrent neural network (RNN) or other graph based neural network may be trained to receive the second vehicle 160 transient velocity data, ground reference data, second vehicle 160 reference data and weather reference data, and based on these factors, output the second vehicle 160 transient velocity data, with these factors removed or substantially removed. The process 300 continues in a block 324.

In the block 324, the computer 110 determines an operating condition of the second vehicle 160. As described above, the computer 110 may input the transient velocity data to an input of a neural network such as the convolutional neural network (CNN) 200, or to a recurrent neural network (RNN), and receive an operating condition for the second vehicle 160 at the output 204. In some cases, the computer 110 may pre-process the transient velocity data prior to inputting the data to the neural network. For example, the computer 110 may perform a fast Fourier transform on the transient velocity data and input the transformed data (output of the FFT) to the neural network. The computer 110 may determine, from the neural network output, an operating condition of the second vehicle 160. The computer 110 may further, based on output from the neural network, select or modify selected measurement targets for future measurements. The process 300 continues in a block 326.

In the block 326, the computer 110 determines or updates an expected trajectory of the second vehicle 160 based on the determined operating condition. For example, prior to measuring and evaluating the transient velocity data, the computer 110, based on a location of the second vehicle 160 on a side portion 154 of the road 150, may have estimated that the second vehicle 160 would remain stationary. Based on the transient velocity data, the computer 110 may have determined that the operating condition for the second vehicle 160 is "engine running." The computer 110 may then update the expected trajectory to include, for example, a percentage likelihood that the second vehicle 160 will enter a traffic lane 152 prior to the first vehicle 105 passing the second vehicle 160 or a percentage likelihood that the second vehicle 160 will move and interfere with an auto-park maneuver of the first vehicle 105.

In addition to updating an expected trajectory of the second vehicle 160 based on the determined operating condition, the computer 110 may further update, or generate, an expected trajectory of a door of the second vehicle or a user of the second vehicle 160. For example, in a case that the determined operating condition for the second vehicle 160 is "door opening," the computer 110 may update or generate an expected trajectory for a user of the second vehicle 160 to include a likelihood that the door of the vehicle open into the travel lane or the user of the second vehicle 10 will enter the traffic lane 152 prior to the first vehicle 105 passing the second vehicle 160. The process 300 continues in a block 328.

In the block 328, the computer 110 may, based on the updated expected trajectory of the second vehicle 160 (or based on an expected trajectory of a user the second vehicle 160), change a travel path for the first vehicle 105. For example, in a case that the computer 110 determines that the likelihood of the second vehicle 160 entering the travel lane 152 prior to the first vehicle 105 passing the second vehicle 160 increased from 0.5% to 30%, the computer 110 may change the travel path of the first vehicle 105 to move towards a side of the travel lane 152 farther from second vehicle 160, or to maintain the travel path and slow down so as to be better able to stop in the case that the second vehicle 160 enters the travel lane. In other cases, where a probability of the second vehicle 160 (or the user of the second vehicle) entering the travel lane 152 stays the same or decreases, the computer 110 may leave the travel path and speed of the first vehicle 105 unchanged. The process 300 continues in a block 330.

In the block 330, the computer 110 determines whether a trip end event has occurred. A trip end event is an occurrence, such as receipt of an electrical signal or message on a vehicle data bus, that the vehicle 105 is ending or has ended a trip. The computer 110 may determine, for example, that a trip end event has occurred based on messages on vehicle network, based on a message from the server 132, based on an electrical signal indicating a power down is occurring for the vehicle 50, etc. In the case that a trip end event is detected, the process 300 ends. Otherwise, the process 300 continues in the block 304.

Figure 4:
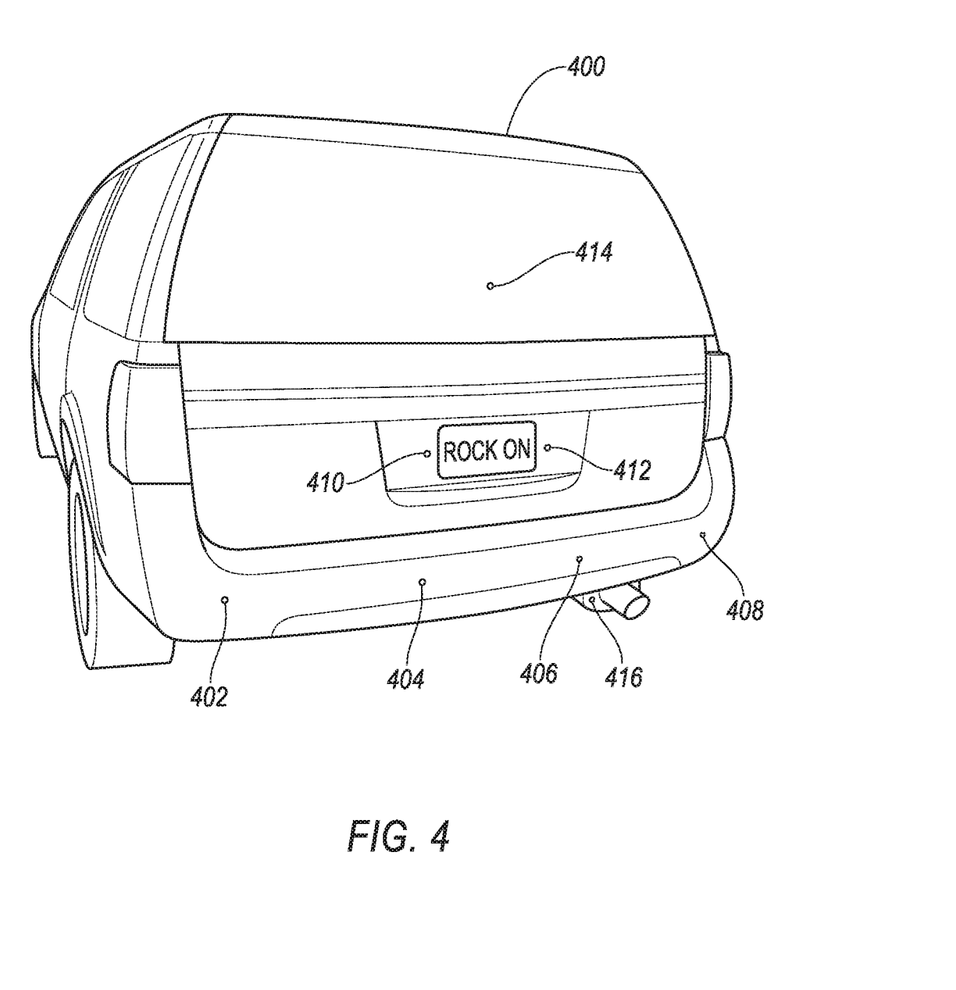
FIG. 4 is a diagram of an example vehicle illustrating possible transient velocity measurement targets.
Figure 5:
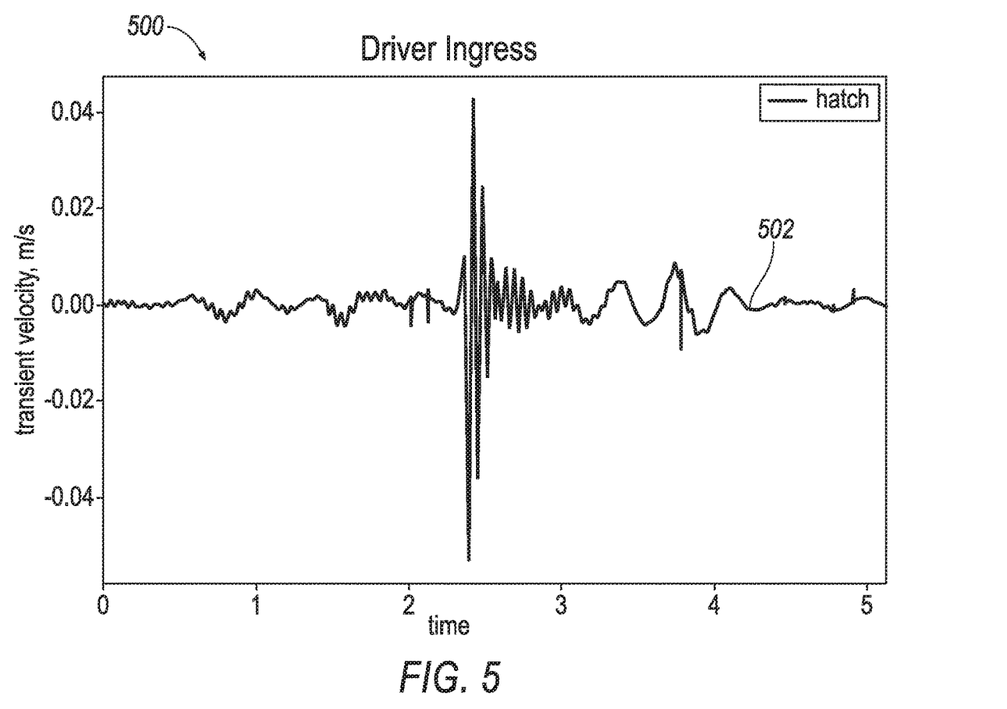
FIG. 5 is a graph of an example vehicle transient velocity (velocity versus time) during a user egress event.
Figure 6:
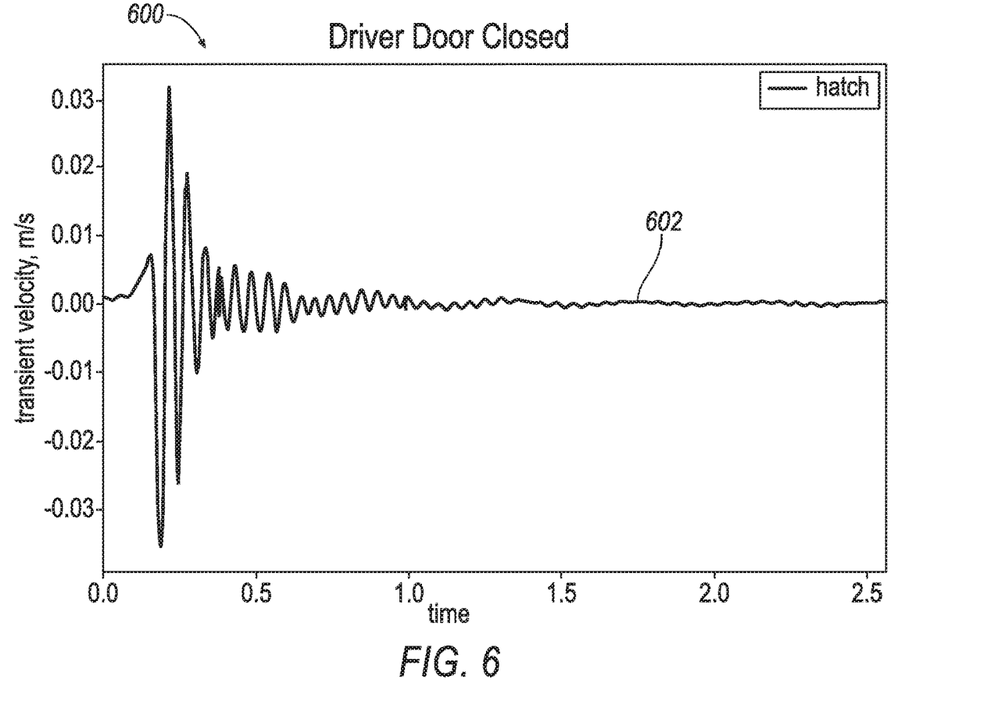
FIG. 6 is a graph of an example vehicle transient velocity during a door closing event.
Figure 7:
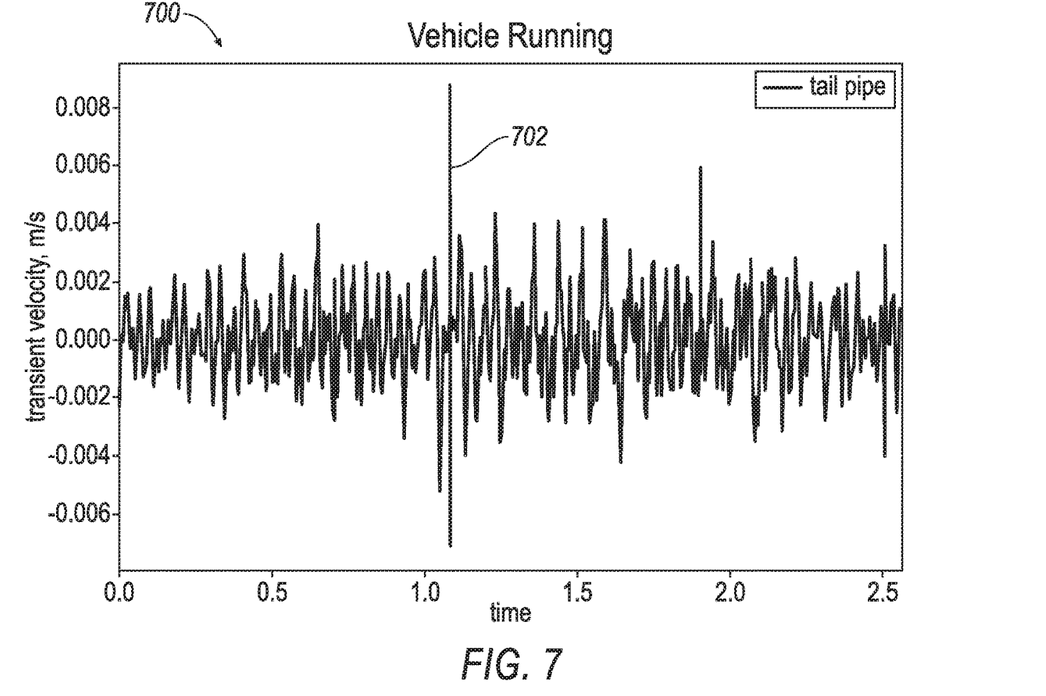
FIG. 7 is a graph of an example vehicle transient velocity for a running vehicle.
Figure 8:
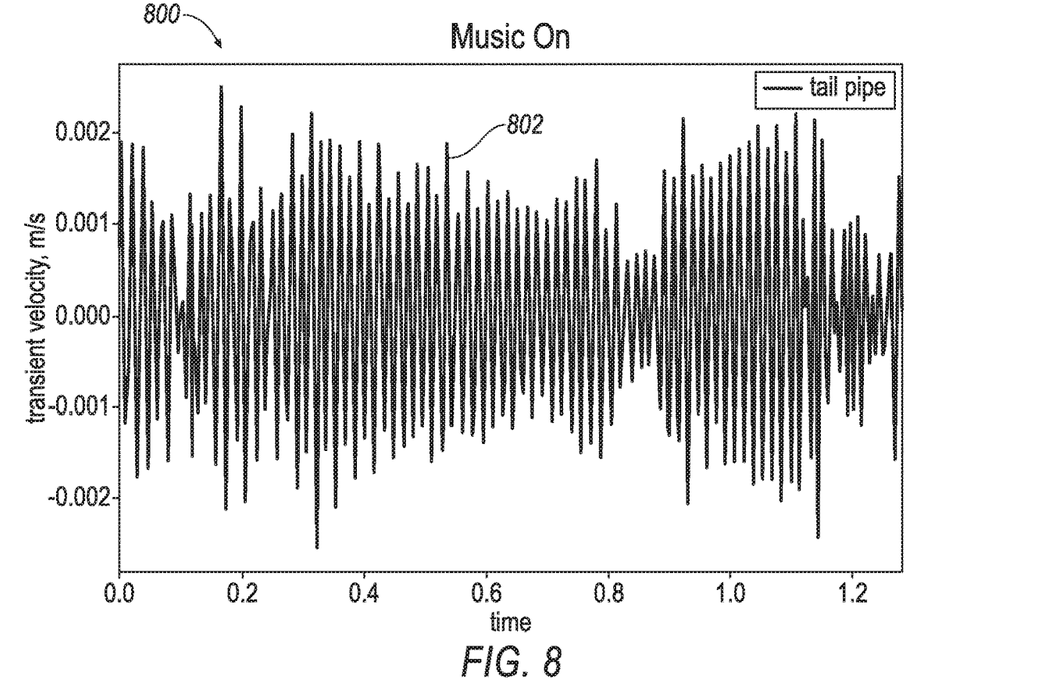
FIG. 8 is a graph of an example vehicle transient velocity while the vehicle is playing music.

Sample measurements of transient velocity were performed on an example vehicle 400 as shown in FIG. 4. The measurements were performed by a laser Doppler vibrometer directed at first, second, third, fourth, fifth, sixth, seventh and eighth measurement targets 402, 404, 406, 408, 410, 412, 414, 416, and indicate transient velocity signature data that can be measured. In this example, the measurement targets are arranged according to Table 3.

TABLE 3

| Measurement Target | Measurement Target Reference Number | Position of Measurement Target on the Vehicle 400 |
| --- | --- | --- |
| First | 402 | left side of rear bumper |
| Second | 404 | left-middle of rear bumper |
| Third | 406 | right-middle of rear bumper |
| Fourth | 408 | right side of rear bumper |
| Fifth | 410 | left of license plate |
| Sixth | 412 | right of license plate |
| Seventh | 414 | hatch |
| Eighth | 416 | exhaust pipe |

The vehicle 400 was measured at each of the measurement targets 402, 404, 406, 408, 410, 412, 414, 416 under each of the following operating conditions: driver door closed, driver egress, driver ingress, key start, music on, parking brake set, vehicle off, vehicle running. Sample transient velocity curves were collected for each measurement.

FIGS. 5-8 illustrate example transient velocity curves for the vehicle 400 under different operating conditions as described in Table 4. Each curve shows transient velocity (expressed in meters per second) for a measurement target for an operating condition.

TABLE 4

| Figure Number | Graph | Curve | Measurement Target | Operating Condition |
| --- | --- | --- | --- | --- |
| 5 | 500 | 502 | hatch | driver ingress |
| 6 | 600 | 602 | hatch | driver door closed |
| 7 | 700 | 702 | exhaust pipe | vehicle running |
| 8 | 800 | 802 | exhaust pipe | music on |

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Intercal, Simulink, Stateflow, Visual Basic, Java Script, Perl, HTML, Python, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. CD-ROM and DVD are examples of write once/read many (WORM) devices.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
    identify, based on data from first sensors included in a first vehicle, that a second vehicle proximate to a route of the first vehicle is stationary such that wheels of the second vehicle are not moving with respect to a surface on which the wheels of the second vehicle are resting;
    receive, from second sensors included in the first vehicle, transient velocity data from the second vehicle, wherein the transient velocity data includes a measurement of movement of at least a portion of the second vehicle with respect to at least one of a horizontal or a vertical axis defined with respect to the second vehicle;
    determine an operating condition of the second vehicle based on the transient velocity data; and
    operate the first vehicle according to a travel path based at least in part on the operating condition of the second vehicle.

2. The system of claim 1, wherein the processor is further programmed to:
predict a trajectory of the second vehicle based on the determined operating condition.

3. The system of claim 2, wherein the processor is further programmed to:
operate the first vehicle according to the travel path by adjusting the travel path of the first vehicle based on the predicted trajectory of the second vehicle.

4. The system of claim 1, wherein the processor is further programmed to:
predict, based on the determined operation condition, at least one from a set including (1) that a user of the second vehicle will exit the second vehicle and (2) that a door of the second vehicle will open; and
adjust the travel path of the first vehicle based on the prediction.

5. The system of claim 1, wherein the processor is further programmed to:
receive from the second sensors, transient velocity data from the surface on which the wheels of the second vehicle are resting; and
determine the operating condition in part based on the transient velocity data from the surface on which the wheels of the second vehicle are resting.

6. The system of claim 1, wherein the processor is further programmed to:
receive from the second sensors, transient velocity data from a third vehicle proximate to the first vehicle; and
determine the operating condition in part based on the transient velocity data from the third vehicle proximate to the first vehicle.

7. The system of claim 1, wherein the processor is further programmed to:
receive weather data; and
determine the operating condition in part based on the weather data.

8. The system of claim 1, wherein the processor is further programmed to:
select a measurement target on the second vehicle; and
direct the second sensors to collect the transient velocity data from the measurement target.

9. The system of claim 1, wherein the processor is further programmed to:
input the transient velocity data to a trained neural network which determines the operating condition; and
receive the operating condition from the trained neural network.

10. The system of claim 9, wherein the neural network is trained using a plurality of transient velocity data including transient velocity data representative of a stationary vehicle in each of a plurality of controlled operating conditions, the controlled operating conditions corresponding respectively to ground truths for purposes of training the trained neural network.

11. A method comprising:
identifying, based on data from first sensors included in a first vehicle, that a second vehicle proximate to a route of the first vehicle is stationary such that wheels of the second vehicle are not moving with respect to a surface on which the wheels of the second vehicle are resting;
receiving, from second sensors included in the first vehicle, transient velocity data from the second vehicle, wherein the transient velocity data includes a measurement of movement of at least a portion of the second vehicle with respect to at least one of a horizontal or a vertical axis defined with respect to the second vehicle;
determining an operating condition of the second vehicle based on the transient velocity data; and
operating the first vehicle according to a travel path based at least in part on the operating condition of the second vehicle.

12. The method of claim 11, further comprising:
predicting a trajectory of the second vehicle based on the determined operating condition.

13. The method of claim 12, further comprising:
operating the first vehicle according to the travel path by adjusting the travel path of the first vehicle based on the predicted trajectory of the second vehicle.

14. The method of claim 11, further comprising:
predicting, based on the determined operating condition, at least one from a set including (1) that a user of the second vehicle will exit the second vehicle and (2) that a door of the second vehicle will open; and
adjusting the travel path of the first vehicle based on the prediction that the user will exit the second vehicle.

15. The method of claim 11, further comprising:
receiving from the second sensors, transient velocity data from the surface on which the wheels of the second vehicle are resting; and
determining the operating condition in part based on the transient velocity data from the surface on which the wheels of the second vehicle are resting.

16. The method of claim 11, further comprising:
receiving from the second sensors, transient velocity data from a third vehicle proximate to the first vehicle; and
determining the operating condition in part based on the transient velocity data from the third vehicle proximate to the first vehicle.

17. The method of claim 11, further comprising:
receiving weather data; and
determining the operating condition in part based on the weather data.

18. The method of claim 11, further comprising:
selecting a measurement target on the second vehicle; and
directing the second sensors to collect the transient velocity data from the measurement target.

19. The method of claim 11, further comprising:
inputting the transient velocity data to a trained neural network which determines the operating condition; and
receiving the operating condition from the trained neural network.

20. The method of claim 19, wherein the neural network is trained using a plurality of transient velocity data including transient velocity data representative of a stationary vehicle in each of a plurality of controlled operating conditions, the controlled operating conditions corresponding respectively to ground truths for purposes of training the trained neural network.

* * * * *